Patented Feb. 20, 1951

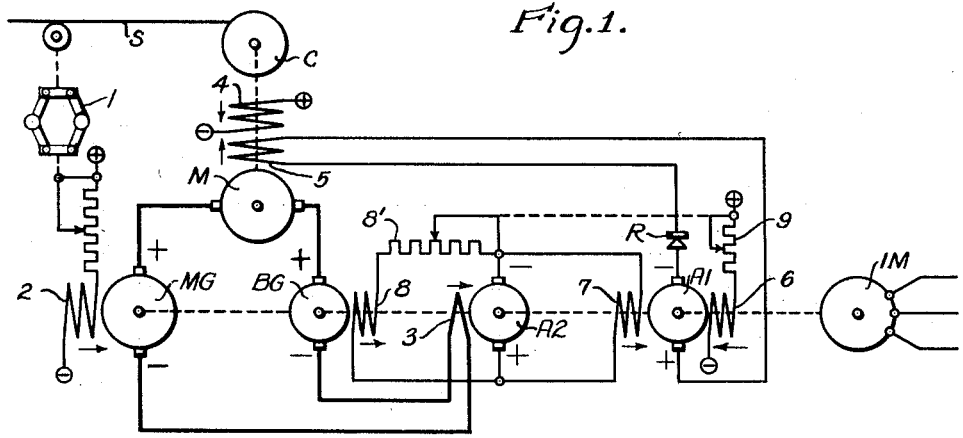

2,542,854

UNITED STATES PATENT OFFICE 2,542,854

ELECTRIC MOTOR CONTROL SYSTEM

Graham Rudge Wilson, Stafford, England, assignor to The English Electric Company Limited, London, England, a British company Application April 2, 1947, Serial No. 738,969
In Great Britain October 29, 1945

Section 1, Public Law 690, August 8, 1946
Patent expires October 29, 1965

5 Claims. (Cl. 242—75)

My invention relates to electric systems of control for dynamo-electric machines; and more particularly, the invention relates to improvements in or modifications of the invention described in British Patent Specification No. 506,742, which is concerned with control systems for coil winding motors operating on direct current.

One of the principal objects of my invention is to provide means to maintain approximately constant tension on a strip of material as paper, sheet metal, wire, or other material which is being coiled, and at the same time to provide the necessary variation of speed of the coil winding motor to correspond with constant strip speed while the coil diameter increases over a wide range, e. g. up to eight or ten times the initial diameter. For this purpose, the control for a direct-current coil winding motor, according to one feature of my invention, comprises means to maintain approximately constant motor armature current and applied voltage over a substantial part of the coiling range, and means effective over the remainder of the range to vary the applied voltage inversely as the current so as to maintain approximately constant power.

Another feature of my invention is to increase the efficiency of the system by the use of one or more generators of appropriate characteristics, instead of a constant voltage source and series resistance, in order to provide the desired variation of voltage with current in the armature of the coil winding motor.

Other objects and advantages will become more apparent from a study of the following subject-matter, particularly when done in conjunction with the accompanying drawing, in which:

Figure 1 is a diagrammatic showing of a preferred embodiment of my invention;

Fig. 2 is a diagrammatic showing of a modification of my invention;

Fig. 3 shows a curve of value in conjunction with the explanation of the novel results of my invention; and Fig. 4 is a diagrammatic showing of a modification of the showing in Fig. 1.

In the embodiment shown in Figure 1, I show a prime mover, as an induction motor IM, for operating the main generator MG, the bucking generator BG, and the amplifying exciters A1 and A2. The prime mover may be a direct-current motor or some other source of driving power, operating either as a function of the speed of strip S or operating as a constant speed. If the operation is at a constant speed, then the rheostatic control 1 should be coupled to alter the excitation of field 2 of the main generator MG as some function of the strip speed. This is schematically shown by the centrifugal control shown. This centrifugal, or ball governor, type of rheostatic control is well known in the art. It will be apparent that, if the speed of the prime mover IM is changed with strip speed, or the excitation of field 2 is altered with strip speed, then some regulation of the coil winding characteristic can be obtained; but usually no very satisfactory control can be thus effected. Further, since the prime mover IM is preferably, in practice, coupled to drive numerous other load units, not shown, having speed requirements of their own, my system of control presupposes that motor IM operates at constant speed and the field 2 of the main generator MG is excited as a function of strip speed.

The armature of the main generator is connected in a loop circuit including the armature of the coil winding motor M, the armature of the bucking generator BG, and the field winding 3 of the amplifying generator A2.

The coil winding motor, for operating the wind-up coil C, has a field winding 4 excited at a constant value and direction, and a differential field 5 excited as a function of the voltage of the amplifying generator A1. The amplifying generator A1 has a field winding 6 excited at a constant value and direction, and a differential field winding 7 excited as a function of the output voltage of the amplifying generator A2. The buck-booster generator BG has a field winding 8 excited as a function of the output voltage of the amplifying generator A2. The differential field 5 of the coil winding motor M is connected in series with the blocking rectifier R. This rectifier may be of the copper-oxide type or similar type, and prevents reversal of the excitation in field winding 5. It will be noted that the differential field 7 for the amplifying generator A1 is excited as a function of the armature current of motor M since the output of the amplifying generator A2 is a function of the mentioned armature current.

Booster generators and bucking generators per se have been used in applications somewhat similar to the application here under consideration and the use of an amplifying generator as A1 is per se known in still other applications also somewhat similar to the application here under consideration, but the benefits of the combined effect of the bucking generator and an amplifying generator are not known in the prior art.

In this dual arrangement, it is thus apparent that the armature of the coil winding motor is connected in series with the booster generator and since the voltage of this generator is a function of the motor armature current, the effective voltage on the coil winding motor M will thus be a function of the effects of the main generator MG, the bucking generator, and the two amplifying generators.

For some applications, the bucking generator alone may be used; and, for still other applications, the amplifying generator A1 alone may be used, but I have found that the most satisfactory control is obtained by a combination of the two types of control.

From the circuits discussed, it is apparent that as the armature current of the coiler motor M tends to rise, the output voltage of the amplifying exciter A1 thus tends to fall, and so the resultant excitation of the coiler motor tends to rise and thus the rise of its armature current is checked. In this way, an equilibrium is established and the armature current is maintained constant as the coil diameter varies; although the required torque varies proportionately with coil diameter and the motor speed varies in inverse proportion therewith.

An adjustable rheostat 9 connected in series with the main separately excited field winding 6 of the amplifying exciter A1 provides means for adjustment of the value of armature current of the coiler motor which will be automatically maintained in this manner.

To provide a greater range of adjustment for the field winding 8, one terminal of this field winding may be connected to a flexible lead 15' disposed to cooperate with a potentiometer resistor 11' connected across the terminals of the amplifying exciter A2. For the arrangement just mentioned reference should be had to Fig. 4.

The field winding for reducing the voltage applied to the armature of the coiler motor, which in this arrangement is the field winding 8 of the bucking generator BG, will have an adjustable rheostat 8' connected in series to provide means for adjustment of the rate of change of voltage applied to the armature of the coiler motor with the armature current thereof. This rheostat 8' may be coupled mechanically, as indicated by the broken line, with the rheostat which controls the main separately excited field 6 of the first amplifying exciter A1 so as to provide a combined control for strip tension which is effective over the whole winding range.

The differential field winding 7 of the amplifying exciter A1 may be connected, as shown in Fig. 2, across a resistance which is connected in series in the armature circuit of the coiler motor. It is preferred, however, that this winding be excited from the output of a second amplifying exciter A2 which has the heavy-current field winding 3 connected in series with the coiler motor armature.

I utilize the same means, namely generator A2, which are employed to excite the differential field winding 7 of the first amplifying exciter A1, to energize the field winding 8 of the bucking generator BG. The bucking generator BG is thus excited in proportion to armature current, and therefore its voltage remains constant so long as the armature current is kept constant.

As the coil diameter increases from its initial minimum value, the armature current is maintained constant in the manner above described until a limit is reached when the differential field 5 on the coiler motor M has been reduced to zero. The coiler motor is then operating at maximum field. This may occur when the coil diameter has reached about three or four times its initial value. The rectifier R in series with the differential field winding prevents a reversal of current from now occurring and thereby produces a discontinuity in the characteristics of the system. This discontinuity is apparent from the showing in Fig. 3. At first the coil speed decreases from point $a$ to point $b$. From point $b$ to point $c$ the control effect of exciter A1 is absent and in consequence the control effect changes to a straight line because the effect of exciter A2 is proportional to armature current only.

As the coil diameter increases still further, the armature current of the coiler motor M will proceed to rise. The excitation of the bucking generator BG will, however, rise in proportion and so the voltage applied to the armature of the coiler motor M will be progressively decreased.

Because the voltage of the bucking generator BG varies linearly with armature current, it is not possible to maintain quite constant the product of armature current and collar motor voltage. It may be preferred that the coiler motor power be allowed, as the winding proceeds, to rise to some extent and then to fall again, never falling below the value which has been maintained constant while the differential field was functioning. Alternatively, it may be allowed to rise at first to a lesser extent, and then to fall below the constant value, so that the maximum actual departure from constant power is not so great.

The adjustment of the excitation of the bucking generator may be such that the voltage applied to the coiler motor armature does not fall off quite so rapidly with armature current as to maintain their product approximately constant. In this way, it is possible to provide compensation for IR drop in the main armature circuit.

The bucking generator may be run at constant speed and may be arranged to return power to the supply mains. Alternatively, if the speed of the strip is to be varied, it may be coupled to a motor which drives an associated machine and which has a speed proportional to the speed of the strip. If it runs at constant speed, and the speed of the strip is to be varied, means must be provided to adjust its excitation in proportion to strip speed. This means may take the form of a potentiometer having a voltage impressed across it proportional to the main armature current and having the field of the bucking generator connected to its movable tap. This arrangement is shown in Fig. 2.

In the showing of Fig. 2, the loop circuit including the main generator MG, the coil winding motor M, and the bucking generator BG includes a resistor 10. The differential field 7 of the amplifying generator A1 is connected directly across the terminals of this resistor 10. A potentiometer resistor 11, as shown, is also connected directly across the terminals of resistor 10. The excitation of field winding 7 is thus directly proportional to the IR drop across resistors 10 and 11 and, since the resistance value of resistors 10 and 11 is constant, it is apparent that the excitation of field 7 is directly proportional to the load current of the coil winding motor.

The field winding 12 of the buck-booster generator is, through a suitable rheostat 13 and adjustable leads 14 and 15, connected to the potentiometer resistor 11. The connections of leads 14 and 15 may be made at any points along the resistor 11. This means that the voltage of the buck-booster generator may be adjusted from positive to negative with reference to the voltage of the main generator; but, regardless of the adjustment, the excitation of field 12 is always a function of the motor armature current.

During the operation, the control causes a variation in coil speed from *a* to *b* (see Fig. 3) as long as the excitation of field 5 changes from a given maximum to zero. Since the blocking rectifier R prevents a reversal of the field current in field 5, an excessive decrease in speed of the motor M is prevented by any cumulative action that field 5 would otherwise produce. The coil speed thus varies, as above mentioned, from point *b* to *c* on the curve shown in Fig. 3.

While I have shown but two systems of control, I do not wish to be limited to the exact showings made, but wish to be limited only by the scope of the claims hereto appended.

I claim as my invention:

1. In a system of control for a motor operating a reel for winding up material so that the reel varies from its empty diameter to its full diameter, in combination, a reel operating motor, having an armature winding and field windings, means responsive to the armature current for increasing the effective excitation of the field windings from a given minimum value to a given maximum value as the windup reel increases in size from a given minimum to a size falling short of full size by a given amount, and means responsive to the armature current for decreasing the armature current as the reel size increases to a full reel.

2. In a control system in combination, a motor having an armature winding and a pair of field windings, one of said field windings being excited at a constant value and the other being excited at a variable differential value, an amplifying generator interconnected with the motor armature winding and adapted to decrease the excitation of the said other field winding from a given maximum value to zero as the armature current tends to rise, a bucking generator in the armature circuit of the motor, and means responsive to the motor armature current for increasing the bucking voltage of the bucking generator.

3. A control for a motor operating a reel for winding up material on the reel so that the reel size varies from an empty reel to a full reel in combination, a direct-current motor having an armature winding mechanically coupled to drive a reel, said motor having a field winding excited at a constant value, an amplifying generator having a voltage output that decreases with a rise in the motor armature current, a differential field winding for said direct-current motor connected to be energized by said amplifying generator, a bucking generator connected in the armature circuit of the direct-current motor, and means for increasing the bucking voltage of said bucking generator as a function of the motor armature current.

4. A control for a motor operating a reel for winding up material on the reel so that the reel size varies from a given relatively small diameter when the reel is substantially empty to full diameter when the reel is full, in combination, a direct-current motor having an armature winding on its rotor which is mechanically coupled to drive the reel, said motor having a field winding energized at a constant value, an amplifying generator having a voltage output that decreases with a rise in the current in the motor armature circuit, a second field winding connected to said amplifying generator, said second field winding being wound to act differentially with respect to the first field winding, whereby the second field winding through the action of the amplifying generator alters the effective excitation of the direct-current motor from a given minimum to a maximum value at the point when the output voltage of the amplifying generator is zero, a bucking generator connected in the armature circuit of the direct-current motor, and a field winding for the bucking generator interconnected with the armature circuit of the motor to effect a rise in bucking voltage of the bucking generator upon a selected rise in armature current.

5. A control for a motor operating a reel for winding up material on the reel so that the reel size varies from a given relatively small diameter when the reel is substantially empty to full diameter when the reel is full, in combination, a direct-current motor having an armature winding on its rotor which is mechanically coupled to drive the reel, said motor having a field winding energized at a constant value, an amplifying generator having a voltage output that decreases with a rise in the current in the motor armature circuit, a second field winding connected to said amplifying generator, said second field winding being wound to act differentially with respect to the first field winding, whereby the second field winding through the action of the amplifying generator alters the effective excitation of the direct-current motor from a given minimum to a maximum value at the point when the output voltage of the amplifying generator is zero, means in the output circuit of the amplifying generator for blocking the flow of a reverse current in the second field winding of the direct-current motor, a bucking generator connected in the armature circuit of the direct-current motor, and a field winding for the bucking generator interconnected with the armature circuit of the motor to effect a rise in bucking voltage of the bucking generator upon a selected rise in armature current.

GRAHAM RUDGE WILSON.

REFERENCES CITED

The following references are of record in the file of this patent:

UNITED STATES PATENTS

| Number | Name | Date |
|---|---|---|
| 1,812,818 | Winne | June 30, 1931 |
| 2,165,127 | Carnegie | July 4, 1939 |
| 2,246,292 | Burt | June 17, 1941 |
| 2,246,294 | Cook | June 17, 1941 |
| 2,284,802 | Cook | June 2, 1942 |
| 2,306,157 | Edwards et al. | Dec. 22, 1942 |